United States Patent [19]

Kishi

[11] 4,429,240

[45] Jan. 31, 1984

[54] STATOR YOKE FOR ELECTRICAL APPARATUS

[75] Inventor: Yoshio Kishi, Tokyo, Japan

[73] Assignee: Sony Corporation, Tokyo, Japan

[21] Appl. No.: 943,747

[22] Filed: Sep. 19, 1978

[30] Foreign Application Priority Data

Sep. 21, 1977 [JP] Japan .................................. 52-112572
Dec. 22, 1977 [JP] Japan .................................. 52-171962

[51] Int. Cl.³ ............................................ H02K 15/12
[52] U.S. Cl. .................................. 310/45; 310/68 R; 310/156; 310/268; 310/DIG. 6
[58] Field of Search ............... 310/68 R, 46, 162–164, 310/43, 45, 254, 258, 40 MM, 154, 156, DIG. 6, 268; 174/68.5; 421/224, 228, 900, 901

[56] References Cited

U.S. PATENT DOCUMENTS

| | | | |
|---|---|---|---|
| 3,093,762 | 6/1963 | Henry-Baudot | 310/268 |
| 3,155,561 | 11/1964 | Rubens et al. | |
| 3,641,429 | 2/1972 | Cox, Jr. et al. | |
| 3,796,039 | 3/1974 | Lucien | |
| 3,845,339 | 10/1974 | Merkle | 310/68 R |
| 3,898,595 | 8/1975 | Launt | |
| 3,979,619 | 9/1976 | Whitley | 310/154 |
| 3,988,024 | 10/1976 | Watanabe | 310/268 |
| 4,011,475 | 3/1977 | Schmider | 310/68 R |
| 4,081,600 | 3/1978 | Kueneman | 174/68.5 |
| 4,115,185 | 9/1978 | Carlson | 174/68.5 |
| 4,120,720 | 10/1978 | Gross | 174/68.5 |
| 4,174,484 | 11/1979 | Schmider | 310/68 R |

FOREIGN PATENT DOCUMENTS

| | | |
|---|---|---|
| 2117405 | of 0000 | Fed. Rep. of Germany . |
| 2532551 | of 0000 | Fed. Rep. of Germany . |
| 2533187 | 7/1975 | Fed. Rep. of Germany . |
| 2718428 | of 0000 | Fed. Rep. of Germany . |
| 2146527 | of 0000 | France . |
| 1223134 | of 0000 | United Kingdom . |
| 1237904 | of 0000 | United Kingdom . |

*Primary Examiner*—R. Skudy
*Attorney, Agent, or Firm*—Lewis H. Eslinger; Alvin Sinderbrand

[57] ABSTRACT

A stator yoke for a DC brushless motor is comprised of a layer of insulating material of a predetermined thickness and a layer of magnetically permeable material which are bonded to each other by adhesive or the like. The magnetically permeable layer can be composed of several steel plates, preferably of silicon steel, bonded to each other. The insulating layer in one embodiment is composed of a cloth-like material, for example, of glass fibers, and a cured adhesive filling the interstices of the cloth-like material and bonding the insulating layer to the magnetically permeable layer.

2 Claims, 12 Drawing Figures

STATOR YOKE FOR ELECTRICAL APPARATUS

BACKGROUND OF THE INVENTION

The present invention relates to an improved magnetic path-forming member, and more particularly relates to a magnetic path-forming member especially suitable for use as a stator yoke in a brushless DC motor.

In a conventional brushless motor, driving armatures are mounted on a stator yoke so as to be interposed in the magnetic path of a rotor magnet and to urge the latter to rotate. A conventional stator yoke is typically made of magnetically permeable material, such as iron plate or electrical steel, so as to provide a path for magnetic flux emanating from the rotor magnet. The armature windings in such a conventional motor are wound on non-conductive (plastic) bobbins with flange portions adapted to abut the stator yoke in order to insulate the armature windings from the metal of the stator yoke.

While a thickness of only 0.1 mm would be sufficient for insulating purposes, the bobbin flange usually has a thickness of 0.5 mm, and cannot be manufactured with a thickness of less than 0.3 mm due to difficulties in molding of the bobbin.

Leakage of magnetic flux occurs in all such motors in the gap between the rotor magnet and the stator yoke, and the amount of flux loss is substantially proportional to the cube of the length of gap spacing. The flux leakage due to interpositioning of the bobbin flange in the path of the magnetic flux significantly reduces the power capacity of the motor. Thus, it is evident that the power of a DC brushless motor can be increased by eliminating the necessity for the bobbin flanges.

OBJECTS AND SUMMARY OF THE INVENTION

It is an object of this invention to provide a magnetic path-forming member capable of avoiding the above noted defects in conventional devices.

It is another object of this invention to provide a magnetic path forming member which avoids significant leakage of magnetic flux.

It is still another object of this invention to provide a magnetic path-forming member which provides insulation between electromagnetic coils and a magnetically permeable material.

It is a further object of this invention to provide a magnetic path-forming member which can advantageously form the structure of an electrical device so as to enable the device to be constructed more compactly.

It is a still further object of this invention to provide a stator yoke in a DC brushless motor which significantly improves the prevention of loss of magnetic flux, as compared with conventional stator yokes.

It is yet another object of this invention to provide a stator yoke in which a printed circuit is provided for wiring electrical members of a DC brushless motor.

It is yet another object of this invention to provide a stator yoke for a DC brushless motor providing enhanced stability and reduced mechanical noise.

In accordance with an aspect of this invention, a magnetic path-forming member, which is especially adaptable for use as a stator yoke in a brushless DC motor, is composed of a layer of magnetically permeable material, such as iron plate, silicon steel plate, or other magnetically soft material, a layer of insulating material of a predetermined thickness, and an agent bonding the magnetically permeable layer to the insulating layer. The magnetically permeable layer can be composed of several steel plates, preferably silicon steel, bonded to each other. In one embodiment, the insulating layer is composed of cloth, such as glass fiber, and a cured adhesive permeating the cloth and filling the interstices of the cloth to form an insulating layer of improved flatness. The cured adhesive also serves to bond the insulating layer to the magnetically permeable layer.

A stator yoke including a magnetic path-forming member, as aforesaid, desirably includes a printed circuit pattern for wiring electrical members of a motor, and which is provided on the surface of the layer of insulating material at the side thereof opposite to the magnetically permeable material.

A DC motor including a stator yoke as described above preferably includes a stator base to which is affixed the layer of magnetically permeable material of the stator yoke. In such a motor, the confronting surfaces of the stator base and the layer of magnetically permeable material can be bonded to each other over substantially their mutual extent. As a result of such bonding, mechanical noise inherent in such motors is substantially reduced.

The above, and other objects, features and advantages of the invention, will be apparent from the following description of preferred embodiments which is to be read in conjunction with the accompanying drawings.

DETAILED DESCRIPTION OF THE PREFERRED EMBODIMENTS

Figure 1:
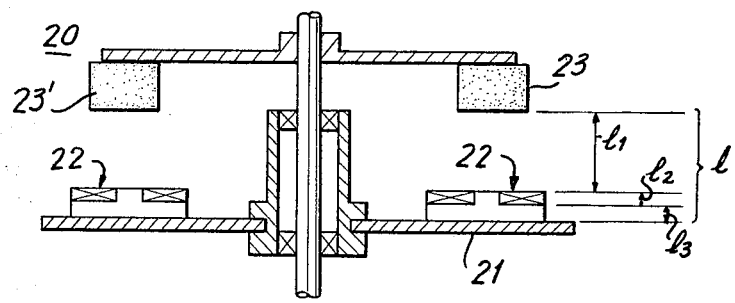
FIG. 1 is a schematic cross-sectional view of a relatively flat brushless motor according to the prior art.
Figure 2:
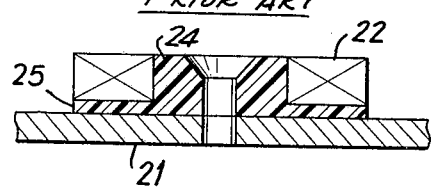
FIG. 2 is an enlarged view of a portion of FIG. 1.

For purposes of contrast with the present invention, FIGS. 1 and 2 show a conventional flat, or axially arranged, DC motor 20 including a stator yoke 21 of magnetically permeable material, such as, iron, silicon steel, or other mechanically soft material, to offer a pathway for magnetic flux. Armature windings 22 are mounted on stator yoke 21 and interposed in the magnetic flux path extending by way of yoke 21 between rotor magnets 23 and 23'. As shown in FIG. 2, armature windings 22 are conventionally wound about bobbins 24 formed of insulating material. Each such bobbin 24 has a flange portion 25 to insulate the respective armature winding 22 from stator yoke 21. The thickness of insulating material necessary to insulate each armature winding 22 from stator yoke 21 is only about 0.1 mm. However, owing to difficulties involved in molding each bobbin 24 from an insulating resin, the insulating flange 25 generally has a thickness of about 0.5 mm, and that thickness cannot be reduced to less than 0.3 mm.

In the DC motor of FIG. 1, magnetic flux flows from one magnet 23 to the stator yoke 21, and thence to an oppositely polarized magnet 23'. A gap of gap length l is provided between each magnet 23, 23' and the stator yoke 21, and the armature windings 22 are interposed in such gap. It should be appreciated that the smaller the gap length l between the rotor magnet 23, 23' and the stator yoke 21, the smaller will be the amount of magnetic resistance in the flux path and, consequently, the greater the flux density will be within the gap in which the armature windings 22 are interposed. Thus, by reducing the gap length l between the magnets 23, 23' and stator plate 21, the efficiency and power of the motor can be improved.

The gap length l can be expressed as the sum $l=l_1+l_2+l_3$, where $l_1$ is the clearance provided for preventing contact of the rotor magnets 23, 23' with the armature windings 22, $l_2$ is the thickness of each armature winding 22 which is determined by the number of turns of the armature, and $l_3$ is the thickness of the insulating material, such as, the flange 25, provided for insulating each armature winding 22 from stator yoke 21.

Figure 3:
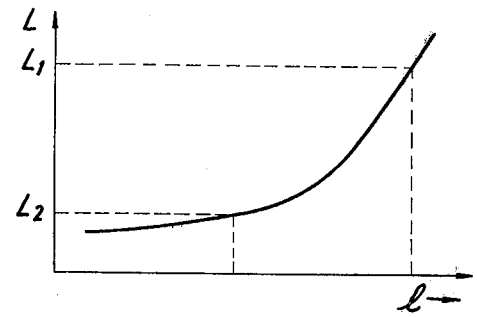
FIG. 3 is a graph showing the relationship of gap size between a rotor magnet and a stator yoke to the coefficient of flux leakage.

The relationship between gap length l and flux leakage coefficient L is shown in FIG. 3. Such relationship obeys a cube dependence, and, as is apparent, as the size of the gap length increases, the coefficient of leakage of the magnetic flux will increase drastically. Thus, the amount of magnetic flux operating on the armature windings 22 is substantially reduced in response to a relatively small increase in gap length l. Due to the thickness of the insulating flange 25 in the conventional motor 20, the leakage coefficient L generally has a large value, for example, as indicated at $L_1$ on FIG. 3. However, the coefficient of flux leakage can be reduced to a substantially lesser value $L_2$ by incorporating in the motor a stator yoke formed of a magnetic path-forming member embodying the present invention.

Figure 4A:
FIGS. 4A and 4B are fragmentary sectional views of magnetic path forming members according to embodiments of the present invention.

As shown on FIG. 4A, a magnetic path-forming member 121 according to this invention may include an insulator base 26 of polyester sheet or the like having a desired thickness and which is bonded at its lower surface, by an adhesive layer 27 of polyamide or the like, to a magnetically permeable plate 28, which may be of silicon steel plate. Such insulator base 26 can be formed with a thickness of only 0.1 mm., and a stator yoke formed of member 121 avoids the large coefficient of magnetic flux leakage L characteristic of conventional DC motors.

Figure 4B:

As shown in FIG. 4B, in another magnetic path-forming member 121' according to the invention, for the purpose of minimizing eddy currents and thus reducing mechanical noise, the single steel plate 28 constituting the magnetic material can be advantageously constructed as a laminate 28' of several layers of steel plate bonded to each other by an adhesive.

Figure 5:
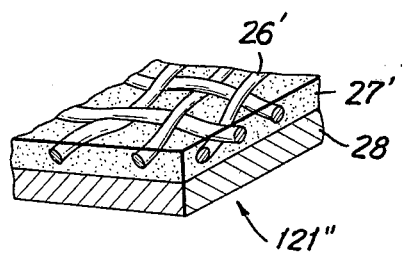
FIG. 5 is a fragmentary perspective view, partly in section, and showing a magnetic path forming member according to another embodiment of this invention.

Further, as shown in FIG. 5, a magnetic path-forming member 121" according to this invention may desirably comprise a cloth-like insulator base 26', for example, of glass fibers, impregnated with an epoxy or other type of curable or thermosetting adhesive 27'. The adhesive 27' fills the interstices of the cloth-like material 26' and is subjected to a curing or heating and pressing process. With this embodiment, a desirably thin insulator base of superior flatness and having a uniform thickness of 0.1 mm. can be easily obtained. The adhesive 27' also serves to bond the insulator to the layer of magnetic material 28.

During production of the magnetic path-forming member 121" shown on FIG. 5, heat can be applied to the steel plate used as the layer 28 of magnetically permeable material. The heating of the steel plate has a hardening action on the adhesive 27' impregnating the cloth-like material 26', and causes the insulating layer 26', 27' to form a very flat surface.

It will be appreciated that a stator yoke formed of a magnetic path forming member 121, 121' or 121" in accordance with the present invention will enable a desirable reduction in the gap length l between the rotor magnets and the stator yoke of a DC brushless motor, thereby affording a substantial reduction in the flux leakage coefficient to a relatively low value $L_2$ (FIG. 3). Thus, a stator yoke constructed according to this invention affords a substantial improvement over conventional stator yokes.

Figure 6:
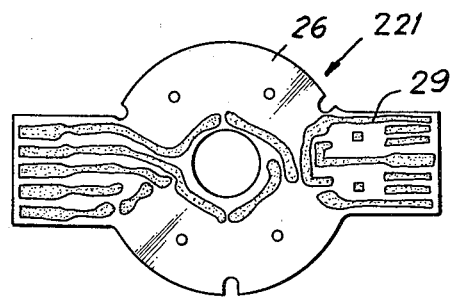
FIG. 6 is a plan view of a stator yoke for use in a motor embodying the present invention.

As shown in FIG. 6, a stator yoke 221 according to the present invention formed of the magnetic path-forming member 121 can be provided with a printed circuit 29 on a surface of its layer of insulating material 26. A copper foil may be applied to the layer 26 of insulating material which is formed as described above. Then, the printed circuit pattern 29 for the armature windings and for rotor position detecting elements or other electrical elements can be easily provided on the stator yoke by subjecting the laminated stator yoke to an etching process.

Thus, a stator yoke constructed as a magnetic path-forming member according to the present invention affords a substantial improvement over conventional stator yokes. As mentioned above, the gap between the rotor magnets and the stator yoke can be substantially reduced thereby enhancing the efficiency of the magnetic coupling between rotor and stator. Such construction also reduces the manufacturing costs and enables the motor structure to be made compactly and simply.

It is to be noted that the magnetic path-forming member according to the present invention may not only be effective as a stator yoke in a brushless DC motor, but can also be incorporated in a DC brush-type motor, an AC motor, or a variety of other electrical devices in which a magnetic path-forming member is a required component. Thus, magnetic path-forming members according to the invention can be readily employed in a solenoid, in an electromagnetic relay, or in any of a variety of the like devices, from which it follows that the present invention has a wide range of applications.

In a conventional brushless motor, the stator yoke 21 is typically fixed to a stator base by mechanical fasteners, such as screws. However, during operation of the motor, an electromagnetic attracting force acting on the stator yoke varies at a frequency of several hundred Hz from −30 grams to +30 grams (±2900 dynes). Such electromagnetic force generates undesirable vibrations and causes mechanical noise. Furthermore, these vibrations tend to loosen the screws or other mechanical fasteners and thereby increase the incidence of motor failure in the case of a conventional motor.

In accordance with the present invention, it is preferred that a stator yoke formed of a magnetic path-forming member 121, 121' or 121", as described above, be bonded to the stator base of a DC brushless motor by an adhesive or the like over substantially the full extent of the confronting surfaces of the stator yoke and the stator base.

Figure 7:
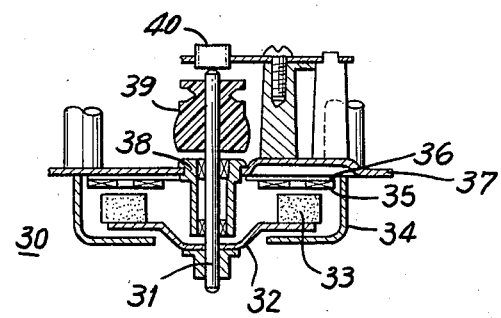
FIG. 7 is a schematic axial sectional view of a DC brushless motor having a stator assembly in accordance with the present invention.

A flat DC brushless motor 30 incorporating the above mentioned aspects of the present invention is shown on FIG. 7 to include a rotor shaft 31 to which a rotor yoke 32 is secured. Rotor magnets 33 are mounted on the rotor yoke 32. A casing 34 is provided to enclose the motor. Armature windings 35 are affixed on a stator yoke 36 in the magnetic path of the rotor magnets 33, and yoke 36 is mounted on a stator base 37. A bearing 38 is fixed in the stator base 37 for supporting rotor shaft 31. A motor pulley 39 may be provided on shaft 31. A thrust bearing 40 is suitably mounted above stator plate 37 to bear the axial forces imposed on shaft 31. As shown on FIG. 8, four armature windings 35 and a pair of rotor position detecting elements 41, such as Hall elements, are disposed on stator yoke 36. In accordance with this invention, stator yoke 36 is affixed to stator base 37 by bonding together the entire confronting surfaces thereof, thereby avoiding the defects of conventional, mechanically fastened stator assemblies. The bonding together or yoke 36 and base 37 can be achieved by any suitable adhesive, or by applying a two-sided adhesive tape therebetween.

The control circuitry and drive amplifiers for providing current to the armature windings 35 are conventional, and, thus, are not described herein.

Figure 9:
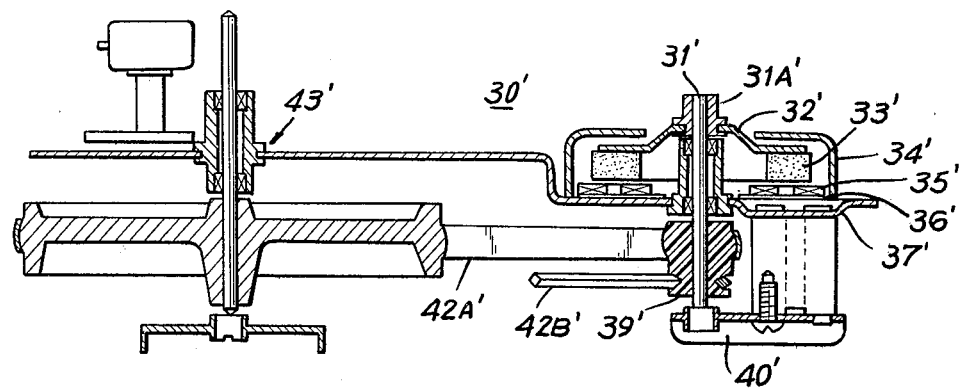
FIG. 9 is a schematic axial sectional view of another DC brushless motor having a stator assembly in accordance with the present invention.

In a conventional motor driven device, such as a tape recorder, a chassis and a motor are provided as separate, independent components, both in terms of structure and of operation. Having studied motors of the type suitable for tape recorders and the like, the present inventors have discovered that the size of the structure and the number of components necessary to provide such tape recorders and other electrical devices can be further reduced by applying the present invention thereto and utilizing a portion of the chassis of the electrical device as a component of the motor. More particularly, in FIG. 9 there is shown an example of a motor 30' in which a portion of the chassis of an electrical device forms a part of the motor, and in which elements corresponding to those described above with reference to FIG. 7 are identified by the same reference numerals by with primes appended thereto. In the apparatus of FIG. 9, a portion of the chassis 37' of a tape recorder is shown to form the stator base 37' of the motor 30'. The rotor shaft 31' bears a boss portion 31A' which connects the shaft 31' with the rotor yoke 32'. The rotor shaft 31' is borne by a thrust bearing 40'. The rotor magnets 33' and the armature windings 35' can be spaced apart a desired distance by adjusting the thrust bearing 40' and thereby adjusting the axial position of the shaft 31'.

The motor pulley 39' provided on shaft 31' has two portions of different diameters which respectively drive a capstan belt 42A' and a fast-forward drive belt 42B'. The capstan drive belt 42A' is shown driving a capstan assembly 43'.

Figure 8:
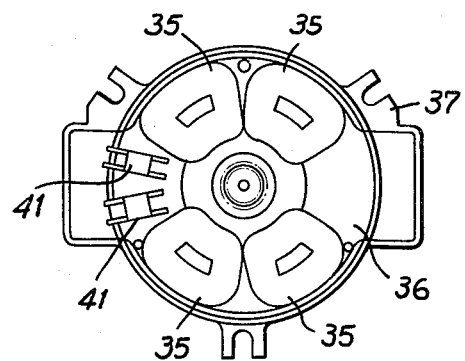
FIG. 8 is a plan view of the stator assembly shown on FIG. 7.
Figure 10:
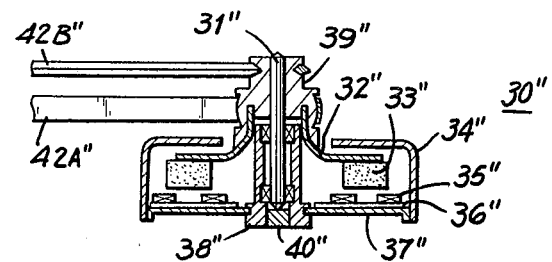
FIG. 10 is a fragmentary schematic axial sectional view of still another DC brushless motor having a stator assembly in accordance with the present invention.

It is possible to further reduce the number of components by constructing the motor 30" as shown on FIG. 10. The elements of FIG. 10 which correspond to elements of the DC motors of FIGS. 8 and 9 are identified by the same reference numerals, but with double-primes appended thereto, and a detailed description thereof is omitted. As shown in FIG. 10, the motor pulley 39" on the rotor shaft 31" serves as both the rotor pulley and the rotor boss. The thrust bearing 40" is incorporated into the bearing 38" which is affixed to the stator base 37".

In the above-described embodiment of FIG. 10, as the motor pulley 39" is formed directly on the rotor shaft 31", there is no need to provide a further motor pulley as a separate element mounted on the motor shaft 31", and thus the structure of the electrical device is simplified, and the cost of production can be reduced.

Figure 11:
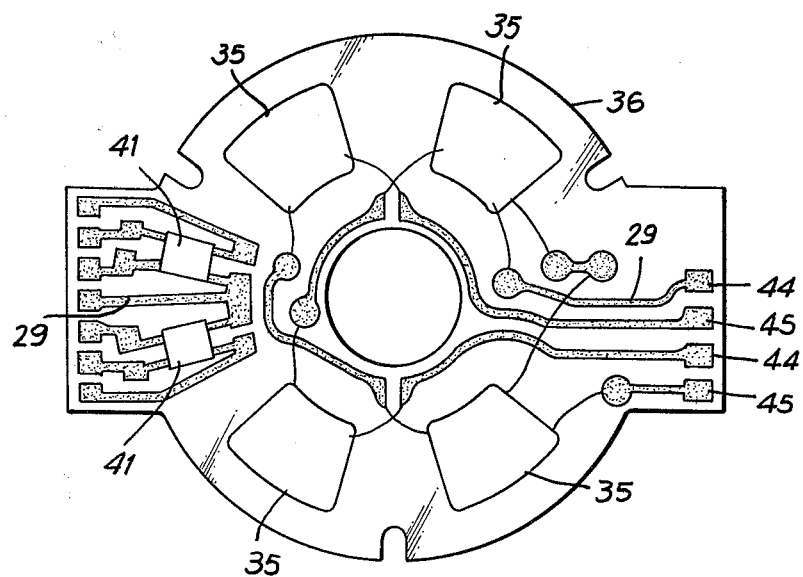
FIG. 11 is a plan view showing the arrangement of armature windings on the stator assembly employed in the DC brushless motor of FIG. 10.

As shown on FIG. 11, the stator assembly for use in the DC motor of any one of FIGS. 8, 9 and 10 includes two pairs of armature windings 35 secured, as by cement, on the stator yoke 36, and being connected by respective portions of printed circuit 29 on insulating layer 26 to first and second armature terminals 44, 45. Another portion of printed circuit 29 connects Hall elements 41 to conventional stator current control circuitry. All elements are securely bonded together and the need for mechanical fasteners is avoided. Even though the stator yoke 36 is urged first in one direction and then in another due to the magnetic attracting force between the stator and the rotor magnets, stable operation is achieved with a minimum of mechanical noise.

Having described various specific embodiments of the invention with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. In a DC brushless motor; a rotor carrying rotor magnets; a stator yoke comprising a layer of insulating material of a predetermined thickness, a layer of magnetically permeable material, and means bonding said layers to each other in superposed relation; wherein said layer of insulating material includes a cloth-like material and a cured adhesive filling interstices of said cloth-like material to form an insulator having a desired thickness and constituting said means bonding said layers to each other; means mounting said stator yoke and said rotor for rotation relative to each other with said layer of insulating material facing toward said rotor magnets and said layer of magnetically permeable material providing a path for magnetic flux between said rotor magnets; and stator coil means bonded to said stator yoke on said layer of insulating material and being interposed in said path of the magnetic flux.

2. A stator assembly for a DC brushless motor, comprising a layer of insulating material of a predetermined thickness, a layer of magnetically permeable material, means bonding said layers to each other in substantially coextensive superposed relation, stator coil means mounted on said layer of insulating material, and means defining a stator base against which a substantial portion of said layer of magnetically permeable material is disposed, confronting surfaces of said stator base and said layer of magnetically permeable material being bonded to each other over substantially their entire extent; wherein said layer of insulating material includes a clothlike material and a cured adhesive filling interstices of said cloth-like material to form an insulator having a desired thickness and constituting said means bonding said layers to each other.

* * * * *